(12) United States Patent
Lin et al.

(10) Patent No.: US 8,908,369 B2
(45) Date of Patent: Dec. 9, 2014

(54) MEMORY COMBINATION AND COMPUTER SYSTEM USING THE SAME

(71) Applicants: Inventec (Pudong) Technology Corporation, Shanghai (CN); Inventec Corporation, Taipei (TW)

(72) Inventors: Yen-Cheng Lin, Taipei (TW); Ming-Hung Shih, Taipei (TW); Hsin-Liang Chen, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 151 days.

(21) Appl. No.: 13/784,841

(22) Filed: Mar. 5, 2013

(65) Prior Publication Data

US 2014/0126136 A1    May 8, 2014

(30) Foreign Application Priority Data

Nov. 8, 2012  (CN) .......................... 2012 1 0444672

(51) Int. Cl.
*G06F 1/16* (2006.01)
*G06F 1/18* (2006.01)

(52) U.S. Cl.
CPC ...................................... *G06F 1/183* (2013.01)
USPC ....... 361/679.48; 439/345; 174/538; 312/237

(58) Field of Classification Search
USPC ............. 455/466, 561, 136, 562.1, 41.1, 560;
361/679.31, 679.32, 679.02, 679.49,
361/679.01, 679.55, 679.27, 679.47,
361/679.48, 679.54, 679.33, 679.04,
361/679.58, 679.09, 679.26; 439/76.1, 638,
439/61, 634, 345, 62, 352, 58, 267, 329,
439/260; 174/257, 265, 138 G, 546, 538;
165/104.33, 80.3; 312/216, 332.1,
312/232.1, 235.1, 237, 118, 241, 313, 34.22

See application file for complete search history.

(56) References Cited

U.S. PATENT DOCUMENTS

| 2005/0198655 | A1* | 9/2005 | Jung et al. | ...................... 720/607 |
| 2009/0267466 | A1* | 10/2009 | Zook et al. | .................. 312/223.6 |
| 2014/0133085 | A1* | 5/2014 | Lin et al. | .................. 361/679.32 |

* cited by examiner

*Primary Examiner* — Hung Duong
(74) *Attorney, Agent, or Firm* — CKC & Partners Co., Ltd.

(57) ABSTRACT

A memory combination includes a first riser board, a second riser board, and a pivotal plate. The first riser hoard includes a plurality of first memory sockets of which long axis directions are parallel to each other. The second riser board includes a plurality of second memory sockets of which long axis directions are parallel to each other. Two end of the pivotal plate are pivotally connected to the first riser board and the second riser board based on an axial direction respectively. When the first and second riser boards rotate to be perpendicular to the pivotal plate, the first memory sockets face the second riser board, and the second memory sockets face the first riser board. The axial direction is perpendicular to the long axis directions of the first memory sockets and the long axis directions of the second memory sockets.

10 Claims, 5 Drawing Sheets

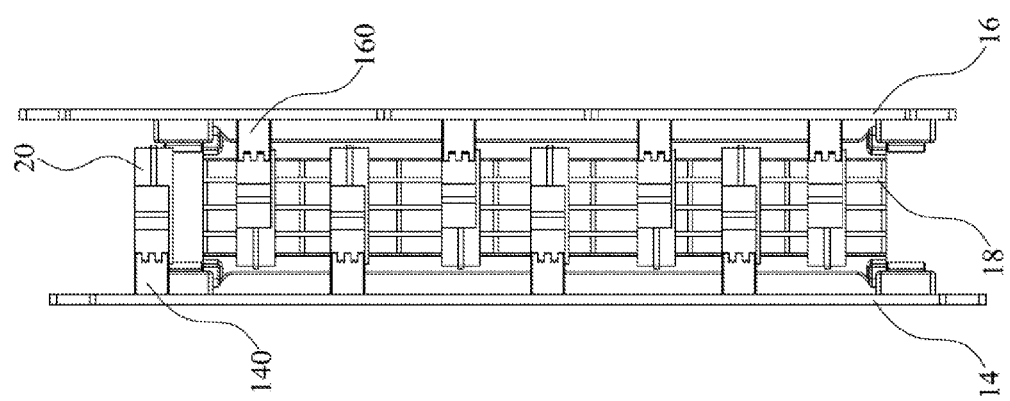

MEMORY COMBINATION AND COMPUTER SYSTEM USING THE SAME

RELATED APPLICATIONS

This application claims priority to China Application Serial Number 201210444672.2, filed Nov.8, 2012, which is herein incorporated by reference.

BACKGROUND

1. Field of Invention

The invention relates to a memory combination and a computer system using the same.

2. Description of Related Art

In existing computer systems, a memory module, such as a Dual In-line Memory Module (DIMM), is mostly inserted directly into memory sockets of a main board. However, in order to use more memory modules in a server, a riser board is utilized to augment the number of the memory modules. In all of the current approaches, a plurality of memory modules are inserted onto a single riser board to form a memory combination, and then the whole memory combination is inserted into a riser socket of the main board. A control chip is configured on the riser board for controlling reading data from and writing data into various memory modules on the riser board.

However, the current arrangement manners that a plurality of riser boards are inserted on the main board all enable the memory modules on each riser board to face towards a same direction and the riser boards are closely arranged. Whereas, the control chip configured on the riser board inevitably occupies a portion of spaces on the riser board, and the occupied space cannot be configured with the memory sockets, so that the space that is between two riser boards and corresponds to the control chip is idle and cannot be utilized efficiently. Therefore, in the case that the height and space of the server are limited, it is a problem to overcome currently that how to place more memory modules in the limited space of the server.

SUMMARY

The invention provides a memory combination, which includes a first riser board, a second riser board and a pivotal plate. The first riser board includes a plurality of first memory sockets. Long axis directions of the first memory sockets are parallel to each other. The second riser board includes a plurality of second memory sockets. Long axis directions of the second memory sockets are parallel to each other. Two ends of the pivotal plate are pivotally connected to the first riser board and the second riser board based on an axial direction respectively. When the first riser board and second riser board rotate relative to the pivotal plate to be perpendicular to the pivotal plate, the first memory sockets face the second riser board, and the second memory sockets face the first riser board. The axial direction is perpendicular to the long axis directions of the first memory sockets and the long axis directions of the second memory sockets.

In an embodiment of the invention, the first memory sockets and the second memory sockets are staggered to each other in an alternate manner.

In an embodiment of the invention, a gap between any two adjacent ones of the above first memory sockets is aligned with one of the second memory sockets, and a gap between any two adjacent ones of the second memory sockets is aligned with one of the first memory sockets.

In an embodiment of the invention, the above first riser board has a first connection portion. The first connection portion is located at a first edge of the first riser board. The second riser board has a second connection portion. The second connection portion is located at a second edge of the second riser board. The first edge and the second edge are parallel to the axial direction.

In an embodiment of the invention, when the first riser board and second riser board rotate relative to the pivotal plate to be parallel to the pivotal plate, the first connection portion is just opposite to the second connection portion.

The invention further provides a computer system, which includes a main board, a first riser board, a second riser board and a pivotal plate. The main board includes a first riser socket and a second riser socket that are configured side by side. The first riser board is inserted to the first riser socket and includes a plurality of first memory sockets. Long axis directions of the first memory sockets are parallel to each other. The second riser board is inserted to the second riser socket and includes a plurality of second memory sockets. Long axis directions of the second memory sockets are parallel to each other. Two ends of the pivotal plate are pivotally connected to the first riser board and the second riser board based on an axial direction respectively. When the first riser board and second riser board rotate relative to the pivotal plate to be perpendicular to the pivotal plate, the first memory sockets face the second riser board, and the second memory sockets face the first riser board. The axial direction is perpendicular to the long axis directions of the first memory sockets and the long axis directions of the second memory sockets.

In conclusion, an essential feature of the memory combination of the invention is that the two riser boards of the memory combination are pivotally connected with a pivotal plate, so that the two riser boards are capable to be unfolded and folded to each other as a book. Another essential feature of the memory combination of the invention is that plurality of memory sockets are respectively configured on the two riser boards. Moreover, when the two riser boards are folded to each other, the memory sockets on the two riser boards are staggered to each other in the alternate manner. Therefore, the memory combination of the invention can have more memory sockets to insert the memory modules. A further essential feature of the memory combination of the invention is that the axial direction between the pivotal plate and the two riser boards is respectively perpendicular to the long axis directions of the memory sockets on the two riser boards. Therefore, when the memory sockets on the two riser boards are filled full of memory modules and the two riser boards are folded to each other, the memory modules on the two riser boards do not come into collision with each other due to interference.

BRIEF DESCRIPTION OF THE DRAWINGS

FIG. 4 is a top view showing the memory combination in FIG. 2B,

DETAILED DESCRIPTION

Figure 1:
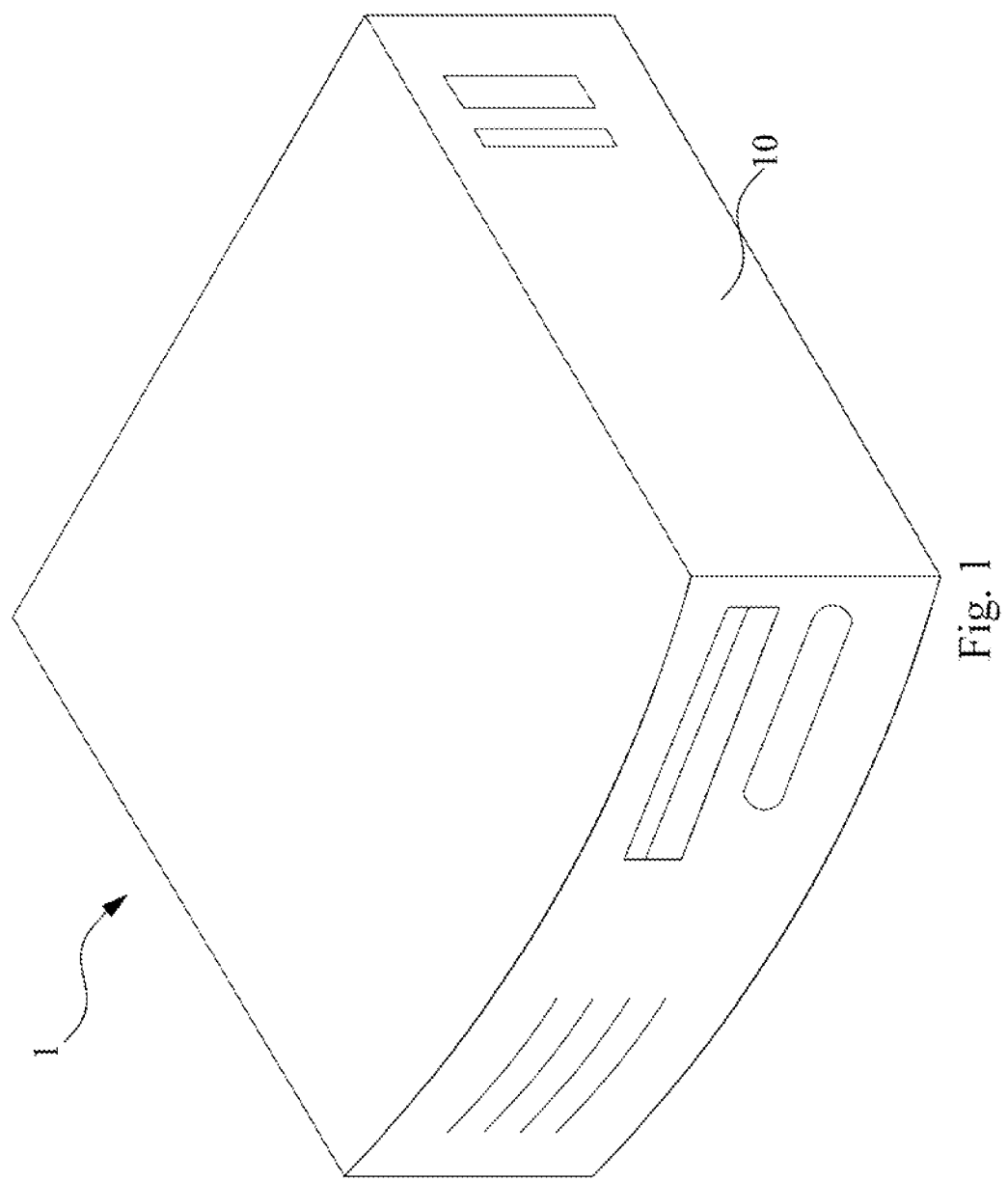
FIG. 1 is a perspective view showing a computer system according to an embodiment of the invention.

A plurality of embodiments of the invention will be disclosed below with reference to drawings. For purpose of clear illustration, many details in practice will be described together with the following description. However, it should be understood that, these details in practice are not used for limiting the invention. That is, in some embodiments of the invention, these details in practice are not necessary. Additionally, for purpose of simplifying drawings, some conventional structures and components in the drawings will be shown schematically.

FIG. 1 shows a perspective view of a computer system 1 according to an embodiment of the invention.

In FIG. 1, the computer system 1 of this embodiment is exemplified by a server, although the invention is not limited in this regard. For any computer system 1, as long as the main board in the computer system 1 has the demand of inserting many memory modules, the concept of the memory combination of the invention can be applied to effectively enhance the space usage inside a housing 10 of the computer system 1.

Figure 2A:
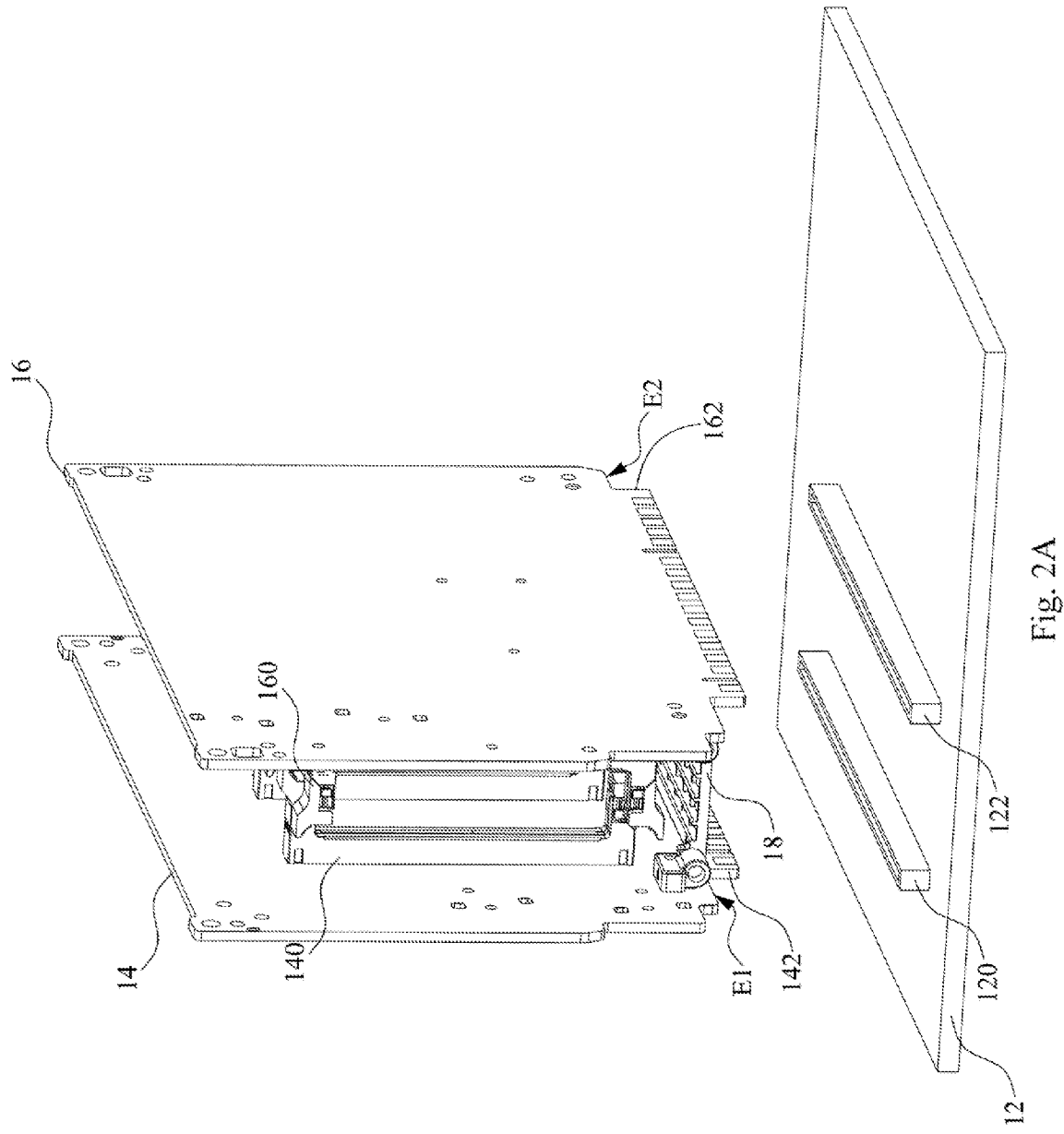
FIG. 2A is a perspective view showing the memory combination according to an embodiment of the invention before being inserted to the main board in the computer system of FIG. 1.
Figure 2B:
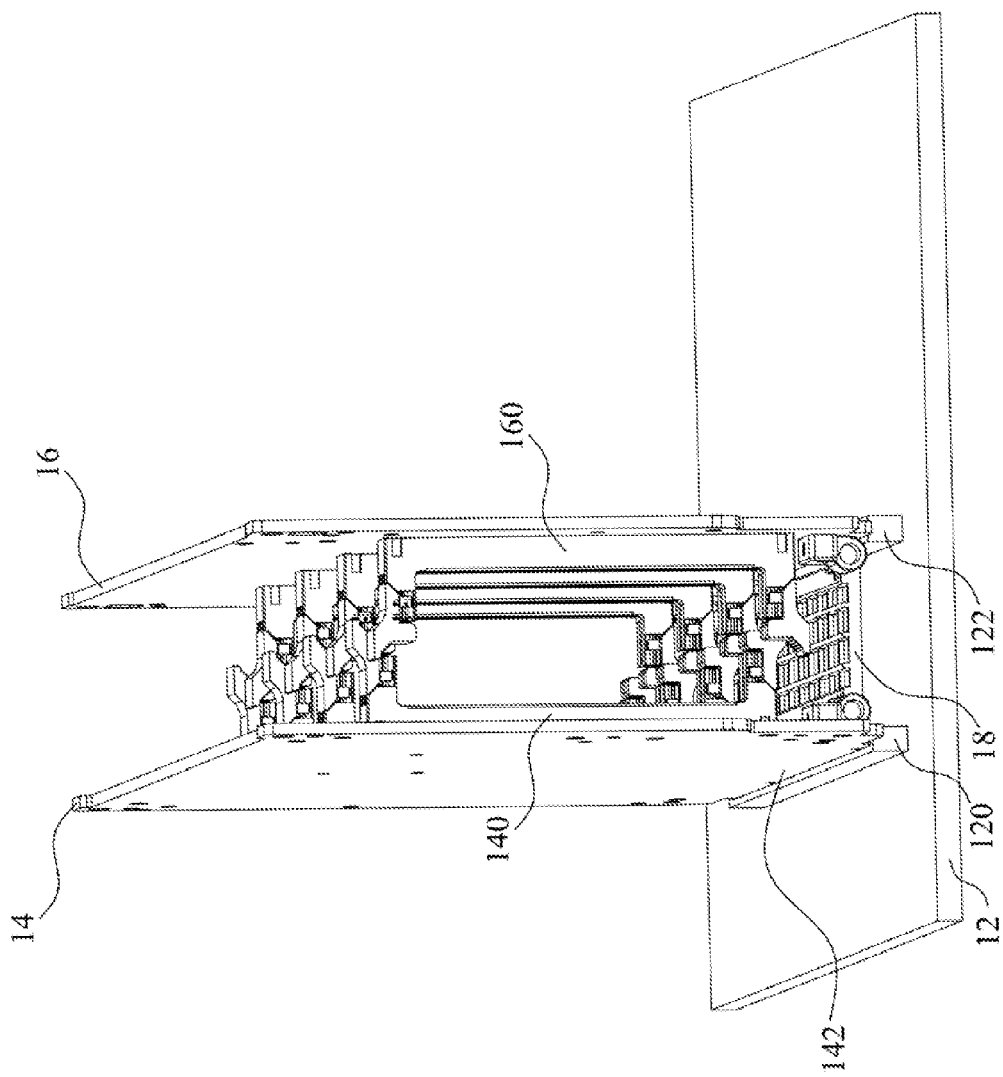
FIG. 2B is a perspective view showing the memory combination in FIG. 2A after being inserted to the main board.
Figure 3:
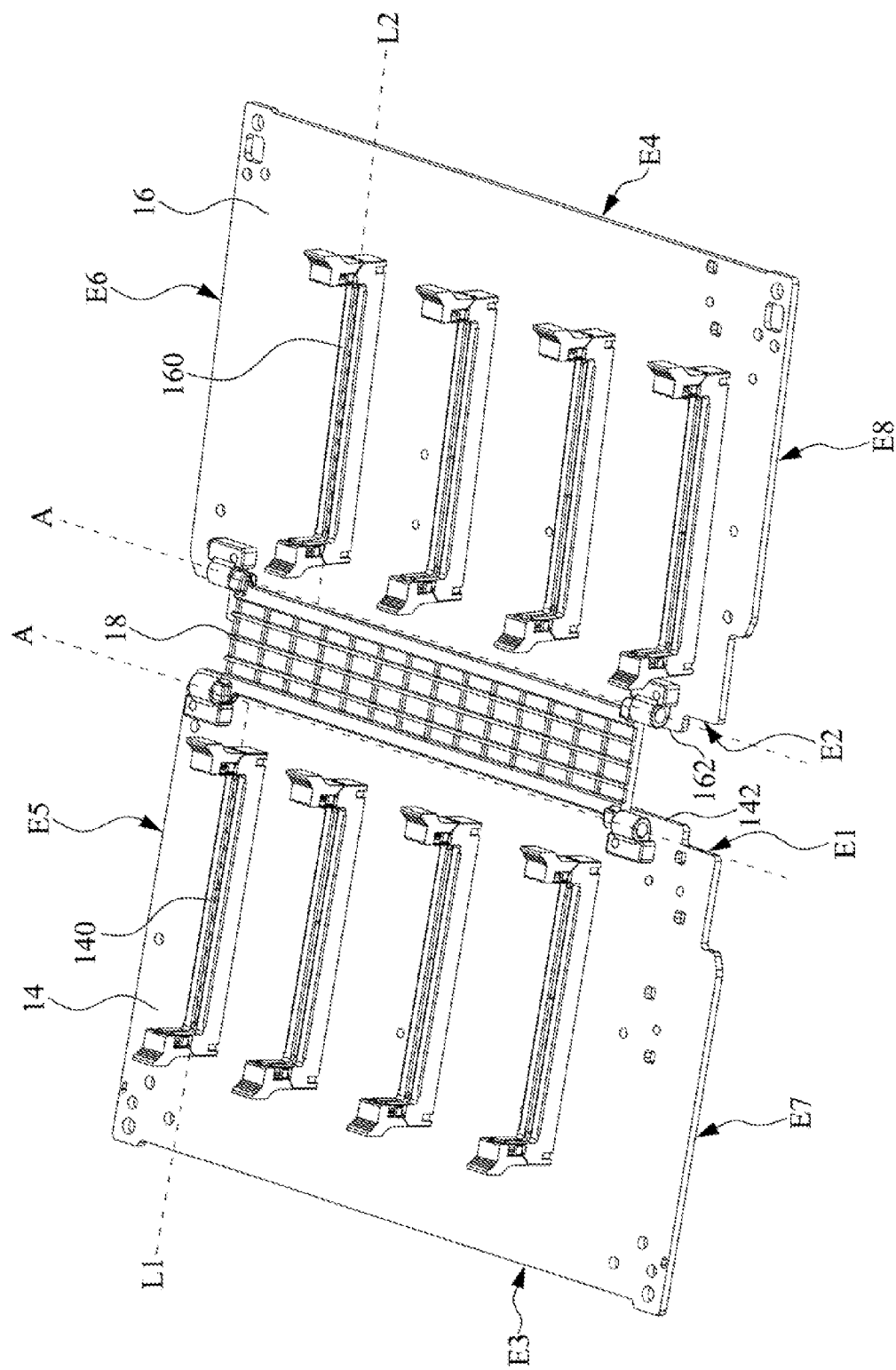
FIG. 3 is a developed view showing the memory combination in FIG. 2A.

FIG. 2A is a perspective view showing the memory combination according to an embodiment of the invention before being inserted to a main board 12 in the computer system 1 in FIG. 1; FIG. 2B is a perspective view showing the memory combination in FIG. 2A after being inserted to the main board 12; and FIG. 3 is a developed view showing the memory combination in FIG. 2A. It should be noted that, in order to clearly present structures of a first riser board 14 and a second riser board 16, memory modules 20 are firstly omitted in FIGS. 2A-3 but shown in FIG. 4.

As shown in FIGS. 2A and 2B, in this embodiment, the main board 12 of the computer system 1 is configured in the housing 10. The main board 12 at least includes a first riser socket 120 and a second riser socket 122 that are configured side by side. That is, in this embodiment, the first riser board 120 and second riser socket 122 of the main board 12 are parallel and adjacent to each other. In addition, the main board 12 may include more than one set of the first riser socket 120 and the second riser socket 122. In actual applications, the number of sets of the first riser socket 120 and the second riser socket 122 included on the main board 12 can be flexibly increased and decreased in terms of actual demands.

As shown in FIG. 3, in this embodiment, the memory combination includes the first riser board 14, the second riser board 16, and a pivotal plate 18. The first riser board 14 of the memory combination includes a plurality of first memory sockets 140. The second riser board 16 of the memory combination includes a plurality of second memory sockets 160. Two ends of the pivotal plate 18 of the memory combination are pivotally connected to the first riser board 14 and the second riser board 16 based on an axial direction A respectively.

When the first riser board 14 and the second riser board 16 rotate relative to the pivotal plate 18 to be perpendicular to the pivotal plate 18, the first memory sockets 140 on the first riser board 14 face the second riser board 16, and the second memory sockets 160 on the second riser board 16 face the first riser board 14.

In other words, when the first riser board 14 and the second riser board 16 are inserted onto the main board 12, the first memory sockets 140 on the first riser board 14 and the second memory sockets 160 on the second riser board 16 are configured oppositely (that is, the first memory sockets 140 and the second memory sockets 160 are configured face to face). The first memory sockets 140 on the first riser board 14 and the second memory sockets 160 on the second riser board 16 are all used to insert the memory module 20 (referring to FIG. 4). For example, the memory module 20 may be a Dual In-line Memory Module (DIMM), although the invention is not limited in this regard.

It should be noted that, here, when the first memory sockets 140 and the second memory sockets 160 are filled full of memory modules 20, during the process that the first riser board 14 and the second riser board 16 rotate relative to the pivotal plate 18 to be perpendicular to the pivotal plate 18, the memory modules 20 located between the first riser board 14 and the second riser board 16 may come into collision with each other due to interference with each other.

Therefore, in this embodiment, the long axis directions L1 of the first memory sockets 140 are parallel to each other, the long axis directions L2 of the second memory sockets 160 are parallel to each other, and the above axial direction A is perpendicular to the long axis directions L1 of the first memory sockets 140 and the long axis directions L2 of the second memory sockets 160. Accordingly, during the process that the first riser board 14 and the second riser board 16 rotate relative to the pivotal plate 18 to be perpendicular to the pivotal plate 18, it can be effectively avoided that the memory modules 20 located between the first riser board 14 and the second riser board 16 come into collision with each other due to interference with each other.

Additionally, as shown in FIG. 3, in this embodiment, the first riser board 14 of the memory combination has a first connection portion 142, and the first connection portion 142 is located at a first edge E1 of the first riser board 14. The first connection portion 142 of the first riser board 14 is used for plugging into the first riser socket 120 of the main board 12. The second riser board 16 of the memory combination has a second connection portion 162, and the second connection portion 162 is located at a second edge E2 of the second riser board 16. The second connection portion 162 of the second riser board 16 is used for plugging into the second riser socket 122 of the main board 12.

In this embodiment, the first edge E1 of the first riser board 14 and the second edge E2 of the second riser board 16 are parallel to the axial direction A. When the first riser board 14 and the second riser board 16 rotate relative to the pivotal plate 18 to be parallel to the pivotal plate 18, the first connection portion 142 is opposite to the second connection portion 162. In other words, when the first riser board 14 and the second riser board 16 rotate relative to the pivotal plate 18 to be parallel to the pivotal plate 18, the pivotal plate 18, the first connection portion 142, and the second connection portion 162 are all located between the first riser board 14 and the second riser board 16 (that is, between the first edge E1 and the second edge E2).

However, the invention is not limited in this regard. In another embodiment, the first connection portion 142 of the first riser board 14 is located at a third edge E3 of the first riser board 14 away from and parallel to the first edge E1 and the axial direction A. The second connection portion 162 of the second riser board 16 is located at a fourth edge E4 of the second riser board 16 away from and parallel to the second edge E2 and the axial direction A. In other words, when the first riser board 14 and the second riser board 16 rotate relative to the pivotal plate 18 to be perpendicular to the pivotal plate 18, the pivotal plate 18 is located at the same side of the first riser board 14 and the second riser board 16 (that is, the side of the first edge E1 and the second edge E2), and the first connection portion 142 and the second connection portion 162 are located at the other side of the first riser board 14 and the second riser board 16 (that is, the side of the third edge E3 and the fourth side E4).

In a further embodiment, the first connection portion 142 of the first riser board 14 is located at a fifth edge E5 of the first riser board 14 perpendicular to the first edge E1 and the axial direction A. The second connection portion 162 of the second riser board 16 is located at a sixth edge E6 of the second riser board 16 perpendicular to the second edge E2 and the axial direction A. In other words, when the first riser board 14 and the second riser board 16 rotate relative to the pivotal plate 18 to be perpendicular to the pivotal plate 18, the pivotal plate 18 is located at the same side of the first riser board 14 and the second riser board 16 (that is, the side of the first edge E1 and the second edge E2), and the first connection portion 142 and the second connection portion 162 are located at the other side of the first riser board 14 and the second riser board 16 (that is, the side of the fifth edge E5 and the sixth side E6).

Alternatively, in still a further embodiment, the first connection portion 142 of the first riser board 14 is located at a seventh edge E7 of the first riser board 14 perpendicular to the first edge E1 and the axial direction A. The second connection portion 162 of the second riser board 16 is located at a eighth edge E8 of the second riser board 16 perpendicular to the second edge E2 and the axial direction A. In other words, when the first riser board 14 and the second riser board 16 rotate relative to the pivotal plate 18 to be perpendicular to the pivotal plate 18, the pivotal plate 18 is located at the same side of the first riser board 14 and the second riser board 16 (that is, the side of the first edge E1 and the second edge E2), and the first connection portion 142 and the second connection portion 162 are located at the other side of the first riser board 14 and the second riser board 16 (that is, the side of the seventh edge E7 and the eighth side E8).

In view of the above, when the first riser board 14 and the second riser board 16 rotate relative to the pivotal plate 18 to he perpendicular to the pivotal plate 18, as long as the first connection portion 142 and the second connection portion 162 are located at the same side of the first riser board 14 and the second riser board 16, it can be achieved that the first connection portion 142 and the second connection portion 162 are respectively plugged into the first riser socket 120 and the second riser socket 122 of the main board 12.

In addition, it should be noted that, here, in order to place more memory modules 20 in the limited space of the computer system 1, in the invention the first memory sockets 140 on the first riser board 14 and the second memory sockets 160 on the second riser board 16 are dislocated to each other.

FIG. 4 shows a top view of the memory combination in FIG. 2B.

As shown in FIG. 4, in this embodiment, the first memory sockets 140 on the first riser board 14 and the second memory sockets 160 on the second riser board 16 are staggered to each other in the alternate manner. Furthermore, the gap between any two adjacent ones of the first memory sockets 140 on the first riser board 14 is aligned with one of the second memory sockets 160 on the second riser board 16. The gap between any two adjacent ones of the second memory sockets 160 on the second riser board 16 is aligned with one of the first memory sockets 140 on the first riser board 14.

More particularly, in this embodiment, when the first riser board 14 and the second riser board 16 are respectively plugged into the first riser socket 120 and the second riser socket 122 of the main board 12, the long axis direction L1 of each of the first memory sockets 140 and the long axis direction L2 of each of the second memory sockets 160 are parallel to each other and perpendicular to the above axial direction A and the main board 12. Therefore, when the first memory sockets 140 and the second memory sockets 160 are filled full of the memory modules 20, the memory modules 20 located between the first riser board 14 and the second riser board 16 do not interfere with each other.

By the above arrangement manner, when the first memory sockets 140 and the second memory sockets 160 are filled full of the memory modules 20, the memory modules 20 located between the first riser board 14 and the second riser board 16 may be presented with an interdigitated profile, in which the memory modules 20 are overlapped and staggered to each other, so that the memory modules 20 can be arranged more closely to effectively utilize the space between the first riser board 14 and the second riser board 16.

However, the disclosure is not limited in this regard. In another embodiment, the first memory sockets 140 on the first riser board 14 may be closely arranged to form a memory socket group, and the second memory sockets 160 on the second riser board 16 also may be closely arranged to form another memory socket group. Therefore, during the process that the first riser board 14 and the second riser board 16 rotate relative to the pivotal plate 18 to be perpendicular to the pivotal plate 18, the first memory sockets 140 on the first riser board 14 and the second memory sockets 160 on the second riser board 16 can be dislocated to each other in an arrangement form of groups, which can also effectively utilize the space between the first riser board 14 and the second riser board 16.

It can be clearly seen from the above detailed description for the specific embodiments of the invention, an essential feature of the memory combination and computer system of the invention is that, the two riser boards thereof are pivotally connected with a pivotal plate, so that the two riser boards are capable to be unfolded and folded to each other as a book. Another essential feature of the memory combination and computer system of the invention is that plurality of memory sockets are respectively configured on the two riser boards. Moreover, when the two riser boards are folded to each other, the memory sockets on the two riser boards are staggered to each other in the alternate manner. Therefore, the memory combination of the invention may have more memory sockets to insert the memory modules. A further essential feature of the memory combination and computer system of the invention is that the axial direction between the pivotal plate and the two riser boards is perpendicular to the long axis directions of the memory sockets on the two riser boards respectively. Therefore, when the memory sockets on the two riser boards are filled full of the memory modules and the two riser boards are folded to each other, the memory modules on the two riser boards do not come into collision with each other due to interference.

Although the invention has been disclosed with reference to the above embodiments, these embodiments are not intended to limit the invention. Those of skills in the art can make various variations and modifications without departing from the spirit and scope of the invention. Therefore, the scope of the invention should be defined by the appended claims.

What is claimed is:

1. A memory combination, comprising:
    a first riser board comprising a plurality of first memory sockets, wherein long axis directions of the first memory sockets are parallel to each other;
    a second riser board comprising a plurality of second memory sockets, wherein long axis directions of the second memory sockets are parallel to each other; and a pivotal plate, wherein two ends of the pivotal plate are pivotally connected to the first riser board and the second riser board based on an axial direction respectively, and when the first riser board and the second riser board rotate relative to the pivotal plate to be perpendicular to the pivotal plate, the first memory sockets face the second riser board, and the second memory sockets face the first riser board, wherein the axial direction is perpendicular to the long axis directions of the first memory sockets and the long axis directions of the second memory sockets.

2. The memory combination of claim 1, wherein the first memory sockets and the second memory sockets are staggered to each other in an alternate manner.

3. The memory combination of claim 2, wherein a gap between any two adjacent ones of the first memory sockets is aligned with one of the second memory sockets, and a gap between any two adjacent ones of the second memory sockets is aligned with one of the first memory sockets.

4. The memory combination of claim 1, wherein the first riser board has a first connection portion located at a first edge of the first riser board, the second riser board has a second connection portion located at a second edge of the second riser board, and the first edge and the second edge are parallel to the axial direction.

5. The memory combination of claim 4, wherein, when the first riser board and second riser board rotate relative to the pivotal plate to be parallel to the pivotal plate, the first connection portion is opposite to the second connection portion.

6. A computer system, comprising:
a main board comprising a first riser socket and a second riser socket that re configured side by side;
a first riser board inserted to the first riser socket and comprising a plurality of first memory sockets, wherein long axis directions of the first memory sockets are parallel to each other;
a second riser board inserted to the second riser socket and comprising a plurality of second memory sockets, wherein long axis directions of the second memory sockets are parallel to each other; and
a pivotal plate, wherein two ends of the pivotal plate are pivotally connected to the first riser board and the second riser board based on an axial direction respectively, and when the first riser board and the second riser board rotate relative to the pivotal plate to be perpendicular to the pivotal plate, the first memory sockets face the second riser board, and the second memory sockets face the first riser board, wherein the axial direction is perpendicular to the long axis directions of the first memory sockets and the long axis directions of the second memory sockets.

7. The computer system of claim 6, wherein the first memory sockets and the second memory sockets are staggered to each other in an alternate manner.

8. The computer system of claim 7, wherein a gap between any two adjacent ones of the first memory sockets is aligned with one of the second memory sockets, and a gap between any two adjacent ones of the second memory sockets is aligned with one of the first memory sockets.

9. The computer system of claim 6, wherein the first riser board has a first connection portion located at a first edge of the first riser board and used for plugging into the first riser socket, and the second riser board has a second connection portion located at a second edge of the second riser board and used for plugging into the second riser socket, and the first edge and the second edge are parallel to the axial direction.

10. The computer system of claim 9, wherein, when the first riser board and second riser board rotate relative to the pivotal plate to be parallel to the pivotal plate, the first connection portion is opposite to the second connection portion.

\* \* \* \* \*